United States Patent
Kardam et al.

(10) Patent No.: US 11,598,898 B2
(45) Date of Patent: Mar. 7, 2023

(54) DETERMINING A WELL OPERATOR LAND AREA

(71) Applicant: Enverus, Inc., Austin, TX (US)

(72) Inventors: Amit Kardam, Missouri City, TX (US); Melwyn Oommen, Missouri City, TX (US)

(73) Assignee: Enverus, Inc., Austin, TX (US)

( * ) Notice: Subject to any disclaimer, the term of this patent is extended or adjusted under 35 U.S.C. 154(b) by 372 days.

(21) Appl. No.: 16/741,088

(22) Filed: Jan. 13, 2020

(65) Prior Publication Data
US 2021/0216804 A1    Jul. 15, 2021

(51) Int. Cl.
| | |
|---|---|
| *G01V 11/00* | (2006.01) |
| *G06K 9/62* | (2022.01) |
| *G06Q 50/16* | (2012.01) |
| *E21B 44/00* | (2006.01) |
| *G06V 10/40* | (2022.01) |
| *G06T 11/40* | (2006.01) |

(52) U.S. Cl.
CPC ............ *G01V 11/00* (2013.01); *G06K 9/62* (2013.01); *G06K 9/6253* (2013.01); *G06Q 50/163* (2013.01); *E21B 44/00* (2013.01); *G06T 11/40* (2013.01); *G06V 10/40* (2022.01)

(58) Field of Classification Search
CPC .......... G06V 10/40; G01V 11/00; G06K 9/62; G06K 9/6253; E21B 44/00
See application file for complete search history.

(56) References Cited

U.S. PATENT DOCUMENTS

| | | | |
|---|---|---|---|
| 2009/0024443 A1 | 1/2009 | Graham et al. | |
| 2012/0054270 A1* | 3/2012 | Foreman ................ | G06Q 10/10 709/203 |
| 2013/0091452 A1 | 4/2013 | Sorden et al. | |
| 2017/0083183 A1* | 3/2017 | Malvin ................ | G09B 29/003 |
| 2017/0364795 A1 | 12/2017 | Anderson et al. | |
| 2019/0073380 A1* | 3/2019 | Thomas ................ | G06T 11/203 |
| 2021/0019350 A1* | 1/2021 | Dixon .................. | G06Q 10/067 |

FOREIGN PATENT DOCUMENTS

| | | | | |
|---|---|---|---|---|
| CN | 110895546 A | * | 3/2020 | ......... G06F 21/6218 |
| KR | 20110034743 A | | 4/2011 | |

OTHER PUBLICATIONS

PCT International Search Report and Written Opinion in International Appln. No. PCT/US2021/013265, dated May 14, 2021, 8 pages.

* cited by examiner

*Primary Examiner* — Douglas Kay
(74) *Attorney, Agent, or Firm* — Fish & Richardson P.C.

(57) ABSTRACT

Techniques for determining an operator position for a hydrocarbon production area include identifying an entity name; determining a plurality of land areas associated with the entity name based on at least one public data set, at least one of the land areas including a hydrocarbon-bearing land area; determining a position associated with the entity name for each of the plurality of land areas based on the at least one public data set and at least one private data set, the position including an operator position or a non-operator position; determining at least a portion of the plurality of land areas in which the determined position associated with the entity name includes the operator position; aggregating the determined portion of the plurality of land areas to generate an operator land area for the entity name; and generating a graphical representation of the generated operator land area to present to a user.

36 Claims, 6 Drawing Sheets

204 ↘

| Determining a first aggregation of land areas based on a first public data set |
| --- |
| 250 |

↓

| Adjusting the first aggregation of land areas to a second aggregation of land areas different than the first aggregation based on a second public data set |
| --- |
| 252 |

↓

| Setting the plurality of land areas to the second aggregation of land areas |
| --- |
| 254 |

| Determining that the position associated with the entity name for each of the land areas is a possible operator position or possible non-operator position based at least in part on a first private data sub-set   260 |
| --- |

↓

| Switching the position associated with the entity name for at least one of the land areas from the possible non-operator position to the possible operator position based at least in part on a second private data sub-set   262 |
| --- |

↓

| Switching the position associated with the entity name for the at least one land areas from the possible operator position to the operator position based at least in part on a third private data set   264 |
| --- |

FIG. 2C

DETERMINING A WELL OPERATOR LAND AREA

TECHNICAL FIELD

This document relates to systems and methods for determining a well operator land area within a geographic area.

BACKGROUND

Business entities in the industry of hydrocarbon exploration and production (e.g., oil and gas exploration and production) may have a variety of business and legal positions in land areas from which hydrocarbons are (or may be) produced). In some aspects, knowledge of a particular business entity's business and legal positions with respect to certain land areas may be helpful.

SUMMARY

In an example implementation, a method for determining an operator position for a hydrocarbon production area includes identifying, with one or more hardware processors, an entity name of a plurality of entity names; determining, with the one or more hardware processors, a plurality of land areas associated with the entity name based on at least one public data set, at least one of the plurality of land areas including a hydrocarbon-bearing land area; determining, with the one or more hardware processors, a position associated with the entity name for each of the plurality of land areas based on the at least one public data set and at least one private data set, the position including an operator position or a non-operator position; determining, with the one or more hardware processors, at least a portion of the plurality of land areas in which the determined position associated with the entity name includes the operator position; aggregating, with the one or more hardware processors, the determined portion of the plurality of land areas to generate an operator land area for the entity name; and generating, with the one or more hardware processors, a graphical representation of the generated operator land area to present to a user on a graphical user interface (GUI).

An aspect combinable with the example implementation further includes determining, with the one or more hardware processors, at least another portion of the plurality of land areas in which the determined position associated with the entity name includes the non-operator position.

Another aspect combinable with any of the previous aspects further includes aggregating, with the one or more hardware processors, the determined another portion of the plurality of land areas to generate a non-operator land area for the entity name.

Another aspect combinable with any of the previous aspects further includes generating, with the one or more hardware processors, a graphical representation of the generated non-operator land area to present to the user on the GUI.

Another aspect combinable with any of the previous aspects further includes simultaneously presenting the graphical representations of the generated operator land area and non-operator land area to the user on the GUI.

Another aspect combinable with any of the previous aspects further includes determining, with the one or more hardware processors, that the position associated with the entity name for each of the plurality of land areas based on the at least one public data set and at least one private data set is exclusive of the operator position and the non-operator position.

Another aspect combinable with any of the previous aspects further includes determining, with the one or more hardware processors, at least an additional portion of the plurality of land areas in which the determined position associated with the entity name is exclusive of the operator position and the non-operator position.

Another aspect combinable with any of the previous aspects further includes aggregating, with the one or more hardware processors, the determined additional portion of the plurality of land areas to generate an unknown land area for the entity name.

Another aspect combinable with any of the previous aspects further includes generating, with the one or more hardware processors, a graphical representation of the generated unknown land area.

Another aspect combinable with any of the previous aspects further includes simultaneously presenting the graphical representations of the generated operator land area, the generated non-operator land area, and the generated unknown land area to the user on the GUI.

In another aspect combinable with any of the previous aspects, the at least one public data set includes one or more of merger and acquisition data associated with the entity name; well permit data associated with the entity name; well completion data associated with the entity name; well production data associated with the entity name; well hydraulic fracturing data associated with the entity name; well trajectory data associated with the entity name; or financial data associated with the entity name.

In another aspect combinable with any of the previous aspects, determining the plurality of land areas associated with the entity name based on at least one public data set includes determining, with the one or more hardware processors, a first aggregation of land areas based on a first public data set; adjusting, with the one or more hardware processors, the first aggregation of land areas to a second aggregation of land areas different than the first aggregation based on a second public data set; and setting, with the one or more hardware processors, the plurality of land areas to the second aggregation of land areas.

In another aspect combinable with any of the previous aspects, determining the position associated with the entity name for each of the plurality of land areas based on the at least one public data set and at least one private data set includes determining, with the one or more hardware processors, that the position associated with the entity name for each of the plurality of land areas includes a possible operator position or possible non-operator position based at least in part on a first private data set; switching, with the one or more hardware processors, the position associated with the entity name for at least one of the plurality of land areas from the possible non-operator position to the possible operator position based at least in part on a second private data set; and switching, with the one or more hardware processors, the position associated with the entity name for the at least one of the plurality of land areas from the possible operator position to the operator position based at least in part on a third private data set.

In another aspect combinable with any of the previous aspects, the at least one private data set includes at least one data set that includes a synthesized wellbore trajectory data set; a parcel land area data set; a synthesized completed merger and acquisition data set; a synthesized proposed merger and acquisition data set; a land tract unit data set; a private drilling permit data set; a private well completion data set; a private well hydraulic fracturing data set; a private well production data set; or private financial data associated with the entity name.

In another aspect combinable with any of the previous aspects, identifying the entity name of the plurality of entity names includes identifying a user selection of the entity name of the plurality of entity names.

The general implementation and example aspects may also be realized in a computing system and computer-readable media. For example, a system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

One, some, or all of the implementations according to the present disclosure may include one or more of the following features. For example, implementations according to the present disclosure may provide critical information for financial business entities (e.g., investors, other operators, financial institutions) as to a more specific and accurate land position in which an entity holds an operating position (i.e., as an operator). Such information may provide, e.g., data on operator drilling capacity, future drilling locations for the operator, value of assets of the operator, and other valuable data. As another example, implementations according to the present disclosure may provide a more granular and accurate view of the well operator (or operators) in certain geographic areas. As another example, implementations according to the present disclosure may provide heretofore unknown information as to a true and actual operator of particular hydrocarbon leases and other land areas. another example, implementations according to the present disclosure may provide an operator a more accurate value its operating (e.g., versus non-operating or unknown) position in a particular geographic area. As another example, implementations according to the present disclosure may provide a more granular and accurate view of which entity holds an operating position (i.e., as an operator) and which entity holds a non-operating position (i.e., as a non-operator) in a given land area. As another example, implementations according to the present disclosure may provide heretofore unknown information as to a true and actual operator/major decision maker of particular hydrocarbon leases and other land areas. Such information may provide e.g., analysis on which entities are proposing wells, as well as supervising drilling and managing day to day operations. In another example, implementations according to the present disclosure may provide heretofore unknown information as to who the non-operators are of particular hydrocarbon leases and other land areas. Such information may provide e.g., analysis on which non-operators are incurring part of the costs and will provide information on successful operator and non-operator relationships in different geographical regions. Implementations according to the present disclosure may also provide critical information for financial business entities (e.g., investors, midstream operators, other operators, financial institutions) as to a more specific and accurate land position in which an entity holds an operating position (i.e., as an operator). Such information may provide, e.g., data on operator production capacity, future drilling locations for the operator, value of assets of the operator, and other valuable data. In some aspects, identifying the extent to which a company's assets are non-operating may be informative as to the extent to which that company controls its own financial destiny, which in turn may be informative about forecasting and strategic analysis. For example, if a company is stretched financially and exposed to non-operating capital requirements, but unable to afford such requirements, that company may need to sell those interests.

The details of one or more embodiments are set forth in the accompanying drawings and the description below. Other features, objects, and advantages will be apparent from the description and drawings, and from the claims.

DESCRIPTION OF DRAWINGS

FIG. 2B illustrates an example sub-process for determining well operator land area according to FIG. 2A.

FIG. 2C illustrates another example sub-process for determining well operator land area according to FIG. 2A.

DETAILED DESCRIPTION

This disclosure discusses techniques (e.g., computer-implemented method, computer program product, computer system) for determining well operator land area (e.g., acreage or other land unit) within a geographical area. For example, public data (e.g., information or other data, raw or synthesized, that is generally available to the public) and private data (e.g., information or other data, raw or synthesized, that is not generally available to the public or data that has been synthesized, manipulated, or aggregated from public data) is used to determine whether a particular entity, such as a hydrocarbon exploration and production company, has an operating position (i.e., is an operator) or a non-operating position (i.e., as a non-operator) with respect to one or more land areas. The one or more land areas in which the entity is an operator may be aggregated to show the entity's operating position within a larger geographic area, such as a state, country, or other geopolitically-divided land area.

In some aspects, an operator (or well operator, or entity with an operating position) may be the business entity (e.g., among several entities associated with a well) that owns the right to drill or produce the well (or both). In some aspects, an operator (or well operator, or entity with an operating position) may be the entity contractually charged with drilling of a test well and production of subsequent wells. In some aspects, an operator (or well operator, or entity with an operating position) may be the entity that serves as a manager and decision-maker of a drilling project. Thus, according to the present disclosure, while there may be two or more business entities associated with a well (i.e., a drilling project, such as a mineral lease on one or land parcels), in some aspects, there may be one and only one business entity that is the operator (or well operator, or entity with an operating position) or retains the operating position. Entities that are not the operator or do not retain the operating position are non-operators, i.e., entities that only retain a non-operating position for the well or drilling project.

In some aspects, a designation of which entity of many entities associated with a well or drilling project may be determined by an operating agreement. In some aspects, the operating agreement is a confidential (e.g., non-public), legally-enforceable agreement between two or more of the many entities that, among other issues, resolves which entity is the operator of the well or drilling project. The operating agreement, for example, may set out the responsibilities and duties of the well operator and one or more non-operators, including, e.g., drilling test wells and subsequent wells, as well as the sharing of expenses and accounting methods used for the well or drilling project.

Figure 1:
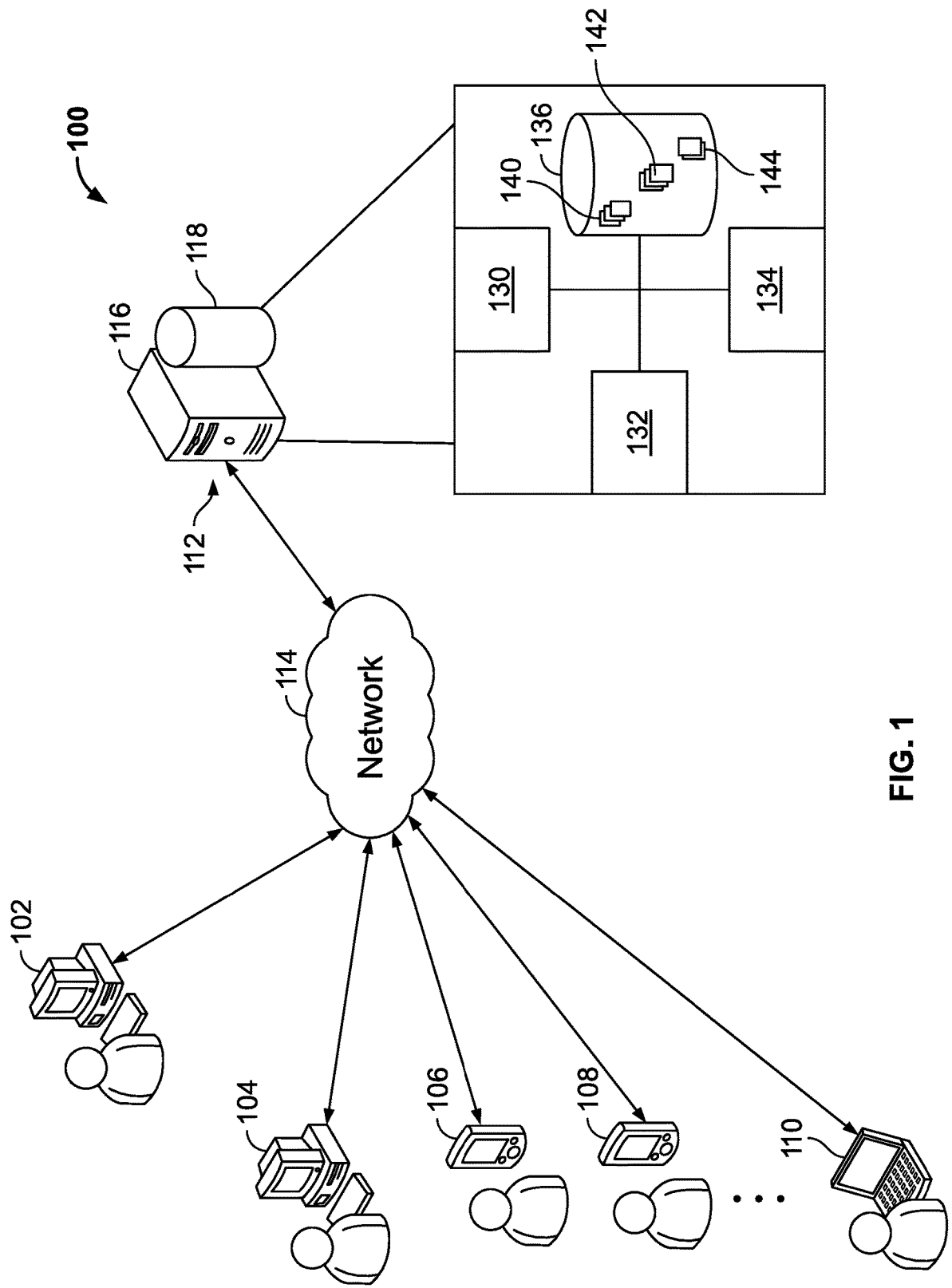
FIG. 1 illustrates an example distributed network architecture that includes one or more client devices and one or more server devices for determining well operator land area according to the present disclosure.

FIG. 1 illustrates an example distributed network architecture 100 that includes one or more client devices and one or more server devices that is operable to determine well operator land area according to the present disclosure. In some aspects, the example distributed network architecture 100 is also operable to determine well non-operator land area according to the present disclosure. The network architecture 100 includes a number of client devices 102, 104, 106, 108, 110 communicably connected to a structured data processing server system 112 ("server system 112") by a network 114. The server system 112 includes a server device 116 and a data store 118. The server device 116 executes computer instructions (e.g., all or a part of a well operator solver application) stored in the data store 118 to perform functions of a well operator service. For example, in some aspects, the well operator service may be a subscription service available to the client devices 102, 104, 106, 108, and 110 (and other client devices) by an owner or operator of the server system 112. In some aspects, the server system 112 may be owned or operated by a third party (e.g., a collocation server system) that hosts the well operator service for the owner or operator of the well operator service.

Users of the client devices 102, 104, 106, 108, 110 access the server device 112 to participate in the well operator service. For example, the client devices 102, 104, 106, 108, 110 can execute web browser applications that can be used to access the well operator service. In another example, the client devices 102, 104, 106, 108, 110 can execute software applications that are specific to the well operator service (e.g., as "apps" running on smartphones). In other words, all of the well operator service may be hosted and executed on the server system 112. Or in alternative aspects, a portion of the well operator service may execute on the client devices 102, 104, 106, 108, and 110 (e.g., to receive and transmit information entered by a user of such client devices and/or to display output data from the well operator service to the user).

In some implementations, the client devices 102, 104, 106, 108, 110 can be provided as computing devices such as laptop or desktop computers, smartphones, personal digital assistants, portable media players, tablet computers, or other appropriate computing devices that can be used to communicate with an electronic social network. In some implementations, the server system 112 can be a single computing device such as a computer server. In some implementations, the server system 112 can represent more than one computing device working together to perform the actions of a server computer (e.g., cloud computing). In some implementations, the network 114 can be a public communication network (e.g., the Internet, cellular data network, dialup modems over a telephone network) or a private communications network (e.g., private LAN, leased lines).

As illustrated in FIG. 1, the server system 112 (e.g., the server device 116 and data store 118) includes one or more processing devices 132, the well operator solver 130, one or more memory modules 136, and an interface 134. Generally, each of the components of the server system 112 are communicably coupled such that the one or more processing devices 132 may execute the well operator solver 132 and access and manipulate data stored in the one or more memory modules 136. Data to be output from the server system 112, or data to be input to the server system 112, may be facilitated with the interface 134 that communicably couples the server system 112 to the network 114.

As illustrated in this example, the one or more memory modules 136 may store or reference one or more well public data sets 140. Each of the well public data sets 140 may comprise data or information that is generally available to the public (e.g., through online or other resources) and may be informative of a particular business entity's operator and non-operator positions in well and drilling projects. For example, well public data sets 140 may include public merger and acquisition data associated with one or more entities associated with a well or drilling project. The well public data sets 140 may also include public well drilling, completion, or production data (or a combination thereof) associated with one or more entities associated with a well or drilling project or associated with the well or drilling project (or both). For example, in some aspects, the well drilling, completion, or production data may be obtained from a public source such as a regulatory agency (e.g., a state railroad commission) or other political agency. As another example, the well public data sets 140 may also include public well trajectory data associated with one or more entities or associated with a well or drilling project (or both). As with the drilling, completion, or production data, well trajectory data may be obtained publicly through, e.g., a regulatory agency (e.g., a state railroad commission) or other political agency. As another example, the well public data sets 140 may also include public well permit (e.g., drilling) data (e.g., reported by a regulatory agency or otherwise) associated with one or more entities or associated with a well or drilling project (or both). As another example, the well public data sets 140 may also include public hydraulic fracturing data (e.g., reported by a regulatory agency or otherwise) associated with one or more entities or associated with a well or drilling project (or both). As another example, the well public data sets 140 may also include public financial data associated with one or more entities associated with the well or drilling project. Public financial data may include, e.g., SEC or public tax filings, reported news, company investor presentations, or other public announcements required of the entity by law (such as when a material change to the business of the entity occurs).

In some aspects, each well public data set 140 may be unique to a particular business entity (e.g., a particular E&P company or other hydrocarbon production entity). In some aspects, a particular well public data set 140 for a particular business entity may be a time-independent view (i.e., "snapshot") of the public data for the business entity that may be informative of that business entity's operator and non-operator positions in well and drilling projects. However, in some aspects, the particular well public data set 140 for the particular business entity may be a time-dependent view of the public data for the business entity that may be informative of that business entity's operator and non-operator positions in well and drilling projects. For example, the particular well public data set 140 may be aggregated public data over a particular time duration (e.g., less than a year, 1 year, many years, life of the business entity, and other possible durations). Thus, rather than a "snapshot" that is informative of that business entity's operator and non-operator positions in well and drilling projects, the well public data set 140 may be a time-comprehensive set of data that is informative of that business entity's operator and non-operator positions in well and drilling projects.

In some aspects, data in a particular well public data set 140 may be simply raw data, i.e., data that has not been manipulated, synthesized, aggregated (except over time), or otherwise interpreted. In alternative aspects, some data in the particular well public data set 140 may be interpreted data, i.e., raw data that has been manipulated, synthesized, aggregated, or otherwise changed to derive the interpreted data. As an example, in some aspects, well trajectory data from a public source may only include two data points: surface entry point location of the well and bottom hole location of the well.

As further illustrated in this example, the one or more memory modules 136 may store or reference one or more well private data sets 142. Each of the well private data sets 142 may comprise data or information that is generally unavailable to the public and may be informative of a particular business entity's operator and non-operator positions in well and drilling projects. For example, well private data sets 142 may include data similar to the public data previously mentioned, such as private completed merger and acquisition data, private well drilling, completion, or production data, or private well trajectory data associated with one or more entities associated with a well or drilling project. In some examples, private merger and acquisition data may also include synthesized proposed merger and acquisition data, such as, for example, private information on proposed deals that is gathered through relationships with other entities (e.g., banks, exploration and production companies, investment entities, and otherwise). As another example, the well private data sets 142 may include land tract unit data and other financial data associated with an entity name. However, the private well data sets 142 may also include private financial data that is not generally available to the public, well trajectory (or permitting, or completion, or fracturing, or production) data that is not generally available to the public, and other information that may be informative of a particular business entity's operator and non-operator positions in well and drilling projects.

As with the public data sets, well private data set 142 may be unique to a particular business entity (e.g., a particular E&P company or other hydrocarbon production entity). Also, in some aspects, a particular well private data set 142 for a particular business entity may be a time-independent view (i.e., "snapshot") of the private data for the business entity that may be informative of that business entity's operator and non-operator positions in well and drilling projects. However, in some aspects, the particular well private data set 142 for the particular business entity may be a time-dependent view of the private data for the business entity that may be informative of that business entity's operator and non-operator positions in well and drilling projects. For example, the particular well private data set 142 may be aggregated private data over a particular time duration (e.g., less than a year, 1 year, many years, life of the business entity, and other possible durations). Thus, rather than a "snapshot" that is informative of that business entity's operator and non-operator positions in well and drilling projects, the well private data set 142 may be a time-comprehensive set of data that is informative of that business entity's operator and non-operator positions in well and drilling projects.

In some aspects, one or more of the private well data sets 142 may comprise raw data. However, one or more of the private well data sets 142 may include or comprise interpreted data that has been compiled, synthesized, manipulated, or otherwise changed to derive the interpreted data. As one example, a particular private well data set 142 may include billing or invoicing data from or to a particular business entity that is not generally available to the public. By interpreting this billing or invoicing data over a time period, synthesized data that may be informative of the that business entity's operator and non-operator positions in well and drilling projects may be compiled.

As shown, the one or more memory modules 136 may store other portions of data that are determined or produced during execution of the well operator solver 130 to, e.g., produce one or more graphical representations of a particular business entity's (or entities') operating positions, non-operating positions, or other representations. Other data, either calculated or determined, generated by execution of the well operator solver 130 (as described herein) may also be stored (even if transiently) in the one or more memory modules 136.

Figure 2A:
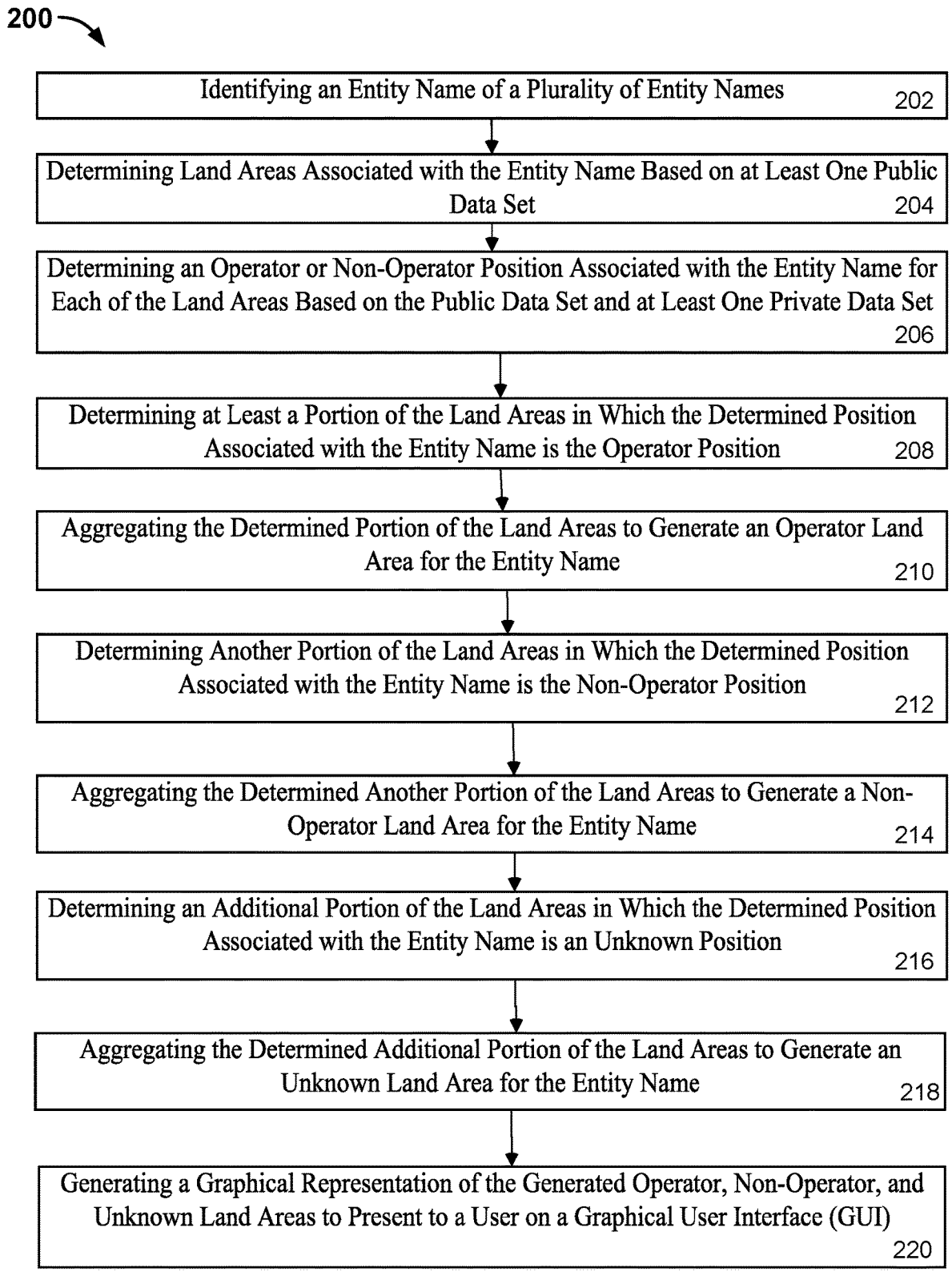
FIG. 2A illustrates an example process for determining well operator land area according to the present disclosure.

FIG. 2A illustrates an example process 200 for determining well operator land area according to the present disclosure. In some aspects, process 200 may be implemented by or with the structured data processing server system 112 shown in FIG. 1. Process 200 may begin at step 202, which includes identifying an entity name of a plurality of entity names. For example, server system 112 may store multiple entity names (e.g., in memory module 136) that may be referenced or accessed by a user of one or more of the client devices 102-110. In some aspects, for instance, a client device 102-110 may be used to access a list of entity names stored in the memory module 136. In some aspects, as previously described, one or more data sets 140 and 142 may be specific to a particular entity name. There may be, therefore, multiple unique data sets 140 and 142 that provide for a number of entity names from which a user of the client devices 102-110 may select. In an example implementation, a drop down menu of entity names may be exposed on the client devices 102-110 from the server system 112, and the user may select one of the listed entity names to identify the particular entity name to the server system 112.

Process 200 may continue at step 204, which includes determining land areas associated with the entity name based on at least one public data set. For example, the identified entity name may be associated with a particular well public data set 140 that includes data or information that is generally available to the public (e.g., through online or other resources) and is informative of the identified entity's operator and non-operator positions in well and drilling projects. As previously described, in some aspects, a well public data set 140 associated with a particular entity may include public merger and acquisition data, public well drilling, completion, or production data (or a combination thereof), public well trajectory data, and public financial data. One or more, or all, of these example public data sources compiled into the well public data set 140 for the identified entity may provide information that establishes whether the identified entity is an operator of a particular land area (e.g., acreage) among a greater geographical unit (e.g., county, state, or otherwise) or a non-operator of the particular land area. However, the one or more, or all, of these example public data sources compiled into the well public data set 140 for the identified entity may lack the information that establishes whether the identified entity is an operator or non-operator of the particular land area, and may simply establish that the identified entity has some unknown interest in the particular land area. In addition, the one or more, or all, of these example public data sources compiled into the well public data set 140 for the identified entity may lack the information that establishes whether the identified entity is an operator or non-operator of the particular land area, or even that the entity has an unknown interest in the particular land area (e.g., may include no information associating the entity name with the particular land area). Thus, the well public data set 140 for the identified entity name may establish that for a particular land area (or land areas), the identified entity is an operator, a non-operator, has an unknown interest, or has no identified association therewith.

Figure 3A:
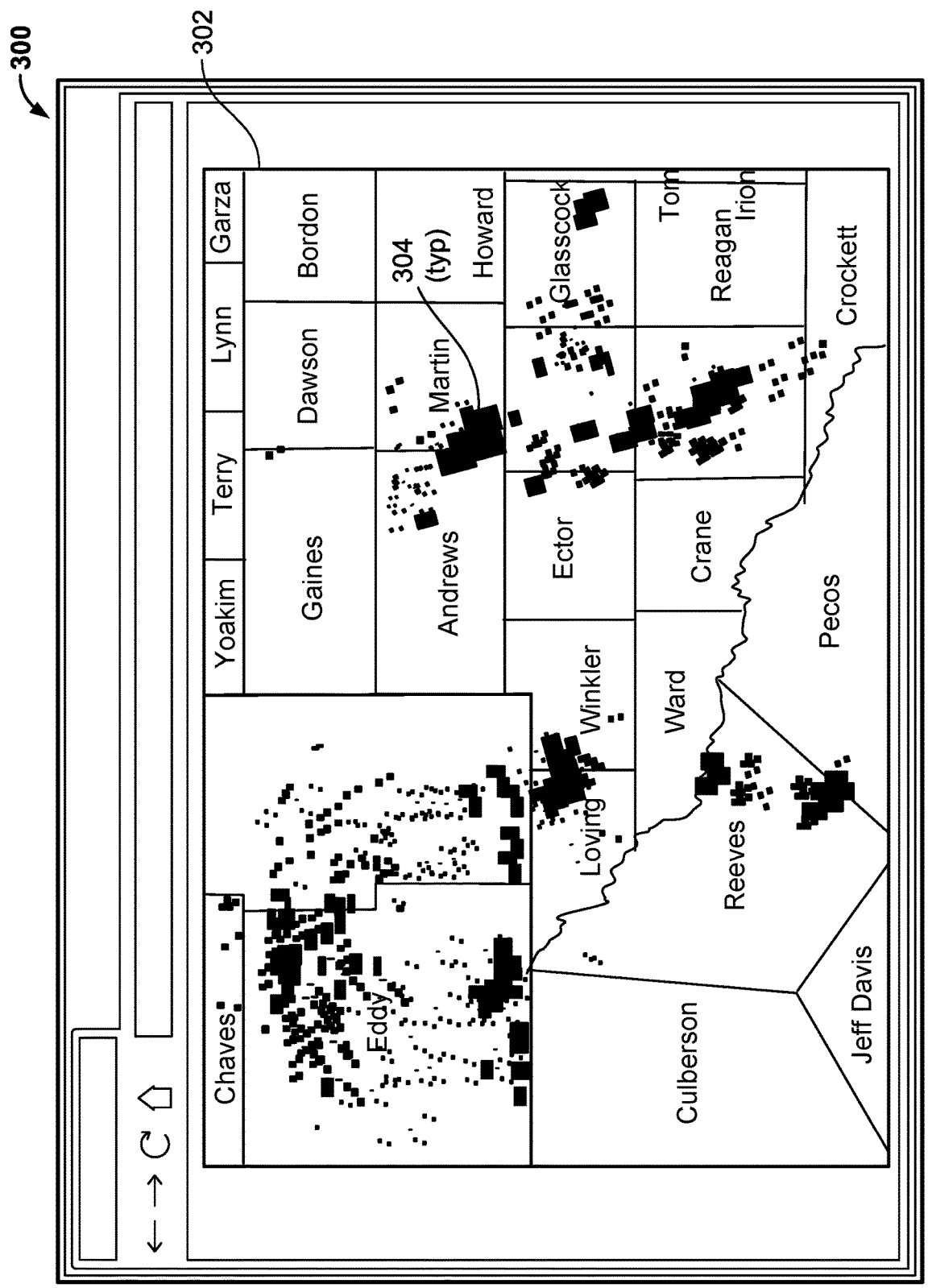
FIGS. 3A-3B illustrate example graphical user interfaces that show operator and non-operator land area according to the present disclosure.

Turning briefly to FIG. 3A, this figure illustrates an example graphical model 302 shown on a GUI 300 of one or more of the client devices 102-110 from step 204 of process 200. For example, as shown in this graphical model 302, land areas 304 represent areas in which the identified entity has an interest, albeit an unknown interest. Thus, in this example, the well public data set 140 established certain land areas 304 in which the entity has an operator or non-operator (i.e., an unknown) interest, but was not informative of whether such unknown interests were, specifically, operator or non-operator.

In an example embodiment, step 204 may be implemented according to the sub-process shown in FIG. 2B. For example, as shown in FIG. 2B, the sub-process of step 204 may begin at step 250, which includes determining a first aggregation of land areas based on a first public data sub-set. For example, as described, each well public data set 140 for the identified entity may include multiple public data sources (or sub-sets). A particular sub-set, e.g., public merger and acquisition data, may indicate that the entity has some unknown interest in certain land areas (e.g., acreage) within a particular county or state. The sub-process of step 204 may continue at step 252, which includes adjusting the first aggregation of land areas to a second aggregation of land areas different than the first aggregation based on a second public data sub-set. For example, another particular sub-set, e.g., well completion and production data, of the well public data set 140 may indicate that the entity has some unknown interest in additional land areas (e.g., acreage) beyond the land areas indicated by the public merger and acquisition data. Thus, the additional land areas may be added to the initial land areas determined in step 250. The sub-process of step 204 may continue at step 254, which includes setting the determined land areas of step 204 as the second aggregation of land areas. Of course, in other example implementations, the sub-process of FIG. 2B may include additional steps of aggregation, e.g., based on the number of public data sources or sub-sets that comprise the well public data set 140 of the identified entity.

Returning to FIG. 2A, process 200 may continue at step 206, which includes determining an operator or non-operator position associated with the entity name for each of the land areas based on the public data set and at least one private data set. For example, the identified entity name may be associated with the particular well public data set 140 that includes data or information that is generally available to the public, as well as a particular well private data set 142, each of which being informative of the identified entity's operator and non-operator positions in well and drilling projects. As previously described, in some aspects, a well private data set 142 associated with a particular entity may include data similar to the public data previously mentioned, such as private merger and acquisition data, private well drilling, completion, or production data, or private well trajectory data associated with one or more entities associated with a well or drilling project. However, the private well data set 142 may also include private financial data that is not generally available to the public, well trajectory data that is not generally available to the public, and other information that may be informative of a particular business entity's operator and non-operator positions in well and drilling projects. One or more, or all, of these example private data sources compiled into the well private data set 142 for the identified entity may provide information that establishes whether the identified entity is an operator of a particular land area (e.g., acreage) among a greater geographical unit (e.g., county, state, or otherwise) or a non-operator of the particular land area.

As with the public data set, one or more, or all, of these example private data sources compiled into the well private data set 142 for the identified entity may lack the information that establishes whether the identified entity is an operator or non-operator of the particular land area, and may simply establish that the identified entity has some unknown interest in the particular land area. In addition, these example private data sources compiled into the well private data set 142 for the identified entity may lack the information that establishes whether the identified entity is an operator or non-operator of the particular land area, or even that the entity has an unknown interest in the particular land area (e.g., may include no information associating the entity name with the particular land area). Thus, the well private data set 142 for the identified entity name may establish that for a particular land area (or land areas), the identified entity is an operator, a non-operator, has an unknown interest.

In an example embodiment, step 206 may be implemented according to the sub-process shown in FIG. 2C. For example, as shown in FIG. 2C, the sub-process of step 206 may begin at step 260, which includes determining that the position associated with the entity name for each of the land areas is a possible operator position or a possible non-operator position based at least in part on a first private data sub-set. For example, in some aspects, private data from a first private data sub-set of the well private data set 142 may indicate that, rather than an unknown position of the particular land areas, the identified entity may be a possible operator position or a possible non-operator position. Thus, in some aspects, one or more particular land areas may be assigned to a "possible operator position" or "possible non-operator position."

The sub-process of step 206 may continue at step 262, which includes switching the position associated with the entity name for at least one of the land areas from the possible non-operator position to the possible operator position based at least in part on a second private data set. For example, in some aspects, private data from a second private data sub-set of the well private data set 142 may indicate that, rather than a possible non-operator position of the particular land area, the identified entity may have a possible operator position in that particular land area. As an example, while private financial data of the well private data set 142 may indicate that the identified entity has a possible non-operator position, private completion and production data may indicate that the identified has a possible operator position in that particular land area. Of course, step 262 may also include switching a previously set position of the identified entity from unknown to possible non-operator, from unknown to possible operator, or from possible operator to possible non-operator. In the present disclosure, a "possible" position may indicate that one or more particular private data sub-sets of the well private data set 142 may provide some indication of a particular position, but without enough statistical confidence to permanently set the position of the entity for that particular land area.

The sub-process of step 206 may continue at step 264, which includes switching the position associated with the entity name for the at least one land areas from the possible operator position to the operator position based at least in part on a third private data set. For example, in some aspects, private data from a third private data sub-set of the well private data set 142 may indicate that, rather than a possible operator position of the particular land area, the identified entity has an operator position in that particular land area. As an example, while private financial data of the well private data set 142 may indicate that the identified entity has a possible non-operator position, and private completion and production data may indicate that the identified has a possible operator position in that particular land area, a private lease agreement indicates that the entity holds the operator position in that particular land area. Of course, step 264 may also include switching a previously set position of the identified entity from possible non-operator to non-operator position as well.

Returning to FIG. 2A, process 200 may continue at step 208, which includes determining at least a portion of the land areas in which the determined position associated with the entity name is the operator position. For example, steps 204 and 206 (and, in some aspects, the sub-process of each step) may be performed iteratively across a number of geographical sub-units (e.g., counties, states, or otherwise) to determine all of the land areas (e.g., acreage) in which the identified entity holds an operator position.

Process 200 may continue at step 210, which includes aggregating the determined portion of the land areas to generate an operator land area for the entity name. For example, once the portion of land areas in which the entity has been determined to hold the operator position are determined in step 208, all such land areas may be aggregated and, e.g., stored in the memory module 136, as the operator land area for the identified entity.

Process 200 may continue at step 212, which includes determining another portion of the land areas in which the determined position associated with the entity name is the non-operator position. For example, steps 204 and 206 (and, in some aspects, the sub-process of each step) may be performed iteratively across a number of geographical sub-units (e.g., counties, states, or otherwise) to determine all of the land areas (e.g., acreage) in which the identified entity holds a non-operator position.

Process 200 may continue at step 214, which includes aggregating the determined another portion of the land areas to generate a non-operator land area for the entity name. For example, once the portion of land areas in which the entity has been determined to hold the non-operator position are determined in step 212, all such land areas may be aggregated and, e.g., stored in the memory module 136, as the non-operator land area for the identified entity.

Process 200 may continue at step 216, which includes determining an additional portion of the land areas in which the determined position associated with the entity name is an unknown position. For example, once the operator and non-operator land areas are determined in steps 210 and 214, such areas may be compared against, e.g., all of the land area determined in step 204 as being associated with the identified entity. A difference between the sum of the operator and non-operator land areas and such land area determined in step 204 may provide the unknown land area for the identified entity, i.e., the land area (e.g., acreage) in which the public and private data sets do not indicate an operator or non-operator position for the entity.

Process 200 may continue at step 218, which includes aggregating the determined additional portion of the land areas to generate an unknown land area for the entity name. For example, once the portion of land areas in which the position of the entity (operator non-operator) is undetermined in step 216, all such land areas may be aggregated and, e.g., stored in the memory module 136, as the unknown land area for the identified entity.

Figure 3B:
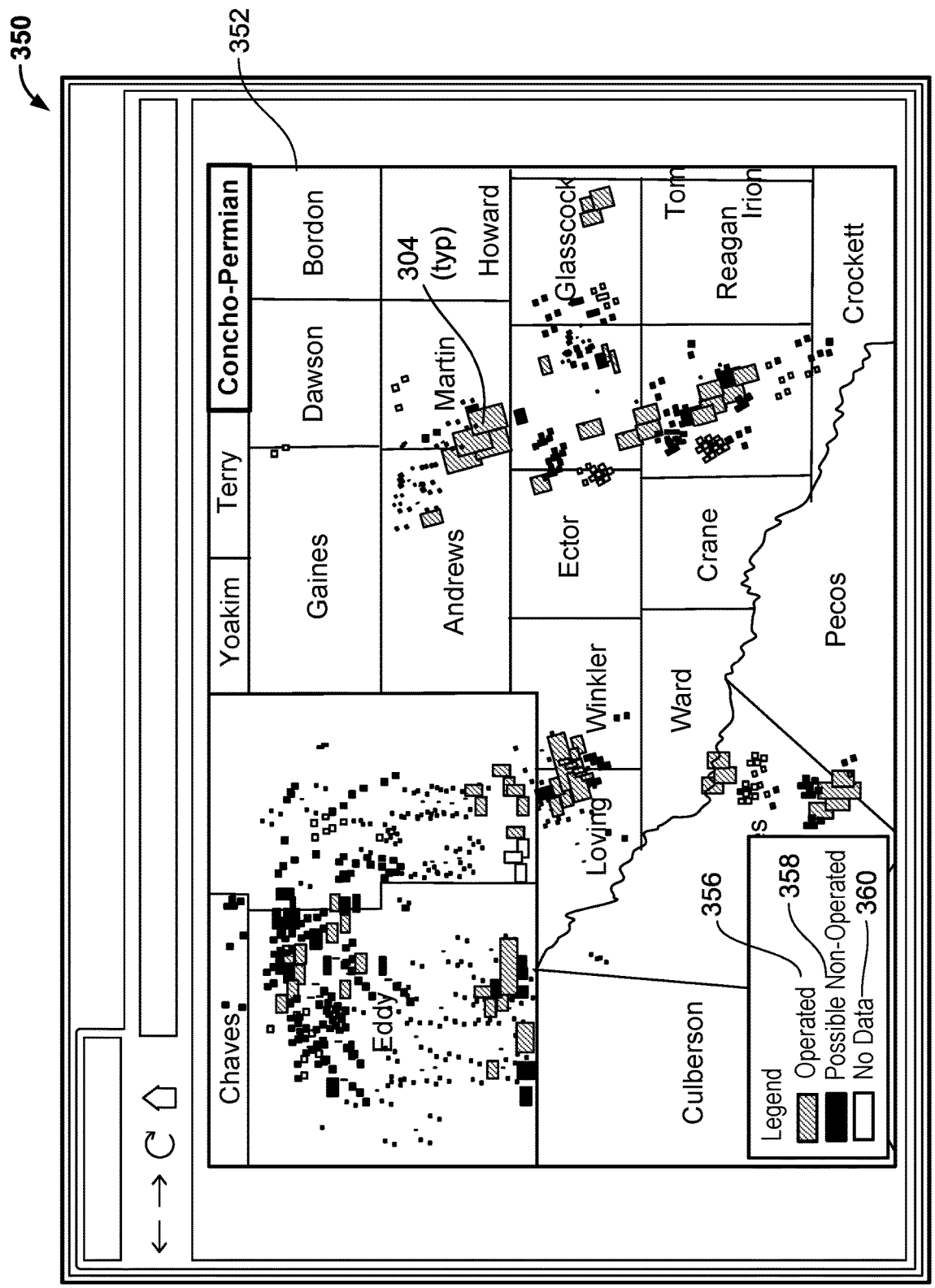

Process 200 may continue at step 220, which includes generating a graphical representation of the generated operator, non-operator, and unknown land areas to present to a user on a graphical user interface (GUI). For example, FIG. 3B illustrates an example graphical model 352 shown on a GUI 350 of one or more of the client devices 102-110 from step 220 of process 200. For example, as shown in this graphical model 352, land areas 356 represent acreage in which the identified entity has the operator position. Land areas 358 represent acreage in which the identified entity has the non-operator position. Land areas 360 represent acreage in which the identified entity has an unknown interest (i.e., some legal or financial interest but not informative of whether such unknown interests were, specifically, operator or non-operator).

One or more steps or sub-steps associated with the described methods, such as some steps or sub-steps not expressly included, may be performed (all or part) by a human operator of the structured data processing server system 112. For example, in some aspects, a human operator may select a particular business entity (out of many) in order to track or determine operating or non-operating positions. In some aspects, a human operator may select one or more different aliases for the selected business entity. In some aspects, a human operator may select all other companies which are recently sold or acquired by the selected business entity, for which the data reporting names have not changed yet (e.g., not yet reported to a regulatory agency). In some aspects, a human operator may check a final output of the operator land areas, non-operator land areas, or otherwise.

Figure 4:
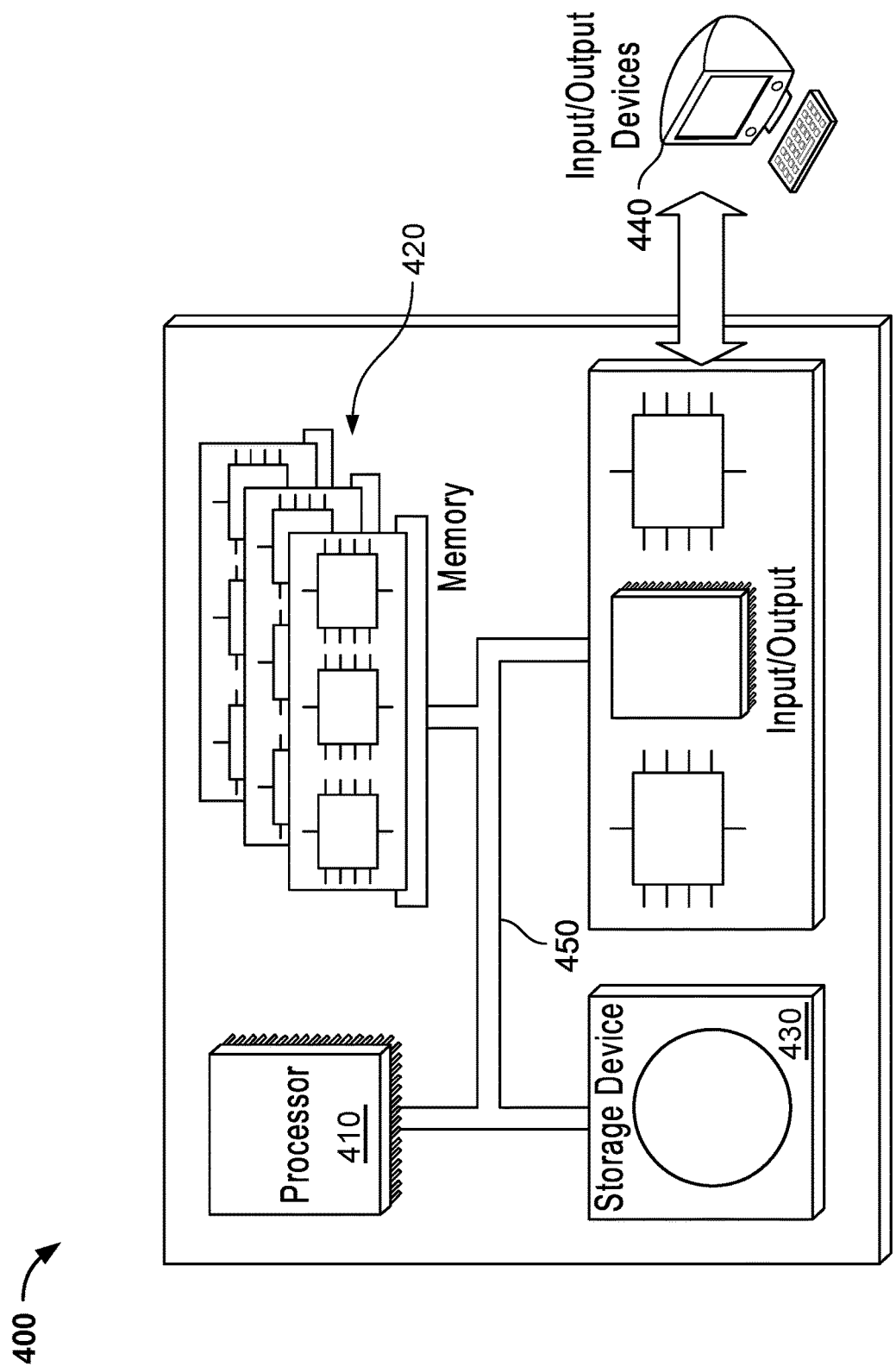
FIG. 4 is a schematic diagram of a structured data processing system that can be used for the operations described in association with any of the computer-implemented processes described herein.

FIG. 4 is a schematic diagram of a computer system 400. The system 400 can be used for the operations described in association with any of the computer-implemented methods described previously, for example as or as part of the structured data processing server system 112 or other data processing systems described herein. The system 400 is intended to include various forms of digital computers, such as laptops, desktops, workstations, personal digital assistants, servers, blade servers, mainframes, and other appropriate computers. The system 400 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. The processor may be designed using any of a number of architectures. For example, the processor 410 may be a CISC (Complex Instruction Set Computers) processor, a RISC (Reduced Instruction Set Computer) processor, or a MISC (Minimal Instruction Set Computer) processor.

In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touch-screen flat-panel displays and other appropriate mechanisms.

The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of embodiments have been described. Nevertheless, it will be understood that various modifications may be made without departing from the spirit and scope of what is described. For example, the steps of the exemplary flow charts in FIGS. 2A-2C may be performed in other orders, some steps may be removed, and other steps may be added. Accordingly, other embodiments are within the scope of the following claims.

What is claimed is:

1. A computer-implemented method for determining an operator position for a hydrocarbon production area, comprising:
identifying, with one or more hardware processors, an entity name of a plurality of entity names;
determining, with the one or more hardware processors, a plurality of land areas associated with the entity name based on at least one public data set, at least one of the plurality of land areas comprising a hydrocarbon-bearing land area;
determining, with the one or more hardware processors, a position associated with the entity name for each of the plurality of land areas based on the at least one public data set and at least one private data set, the position comprising an operator position or a non-operator position;
determining, with the one or more hardware processors, at least a portion of the plurality of land areas in which the determined position associated with the entity name comprises the operator position;
aggregating, with the one or more hardware processors, the determined portion of the plurality of land areas to generate an operator land area for the entity name;
generating, with the one or more hardware processors, a graphical representation of the generated operator land area to present to a user on a graphical user interface (GUI);
determining, with the one or more hardware processors, at least another portion of the plurality of land areas in which the determined position associated with the entity name comprises the non-operator position;
aggregating, with the one or more hardware processors, the determined another portion of the plurality of land areas to generate a non-operator land area for the entity name;
generating, with the one or more hardware processors, a graphical representation of the generated non-operator land area to present to the user on the GUI;
determining, with the one or more hardware processors, that the position associated with the entity name for each of the plurality of land areas based on the at least one public data set and at least one private data set is exclusive of the operator position and the non-operator position;
determining, with the one or more hardware processors, at least an additional portion of the plurality of land areas in which the determined position associated with the entity name is exclusive of the operator position and the non-operator position;
aggregating, with the one or more hardware processors, the determined additional portion of the plurality of land areas to generate an unknown land area for the entity name;
generating, with the one or more hardware processors, a graphical representation of the generated unknown land area;
and simultaneously presenting the graphical representations of the generated operator land area, the generated non-operator land area, and the generated unknown land area to the user on the GUI, of the user device, wherein each land area represents an acreage of the determined position associated with the entity name.

2. The computer-implemented method of claim 1, further comprising simultaneously presenting the graphical representations of the generated operator land area and non-operator land area to the user on the GUI.

3. The computer-implemented method of claim 1, wherein the at least one public data set includes one or more of:
merger and acquisition data associated with the entity name;
well permit data associated with the entity name;
well completion data associated with the entity name;
well production data associated with the entity name;
well hydraulic fracturing data associated with the entity name;
well trajectory data associated with the entity name; or
financial data associated with the entity name.

4. The computer-implemented method of claim 1, wherein determining the plurality of land areas associated with the entity name based on at least one public data set comprises:
determining, with the one or more hardware processors, a first aggregation of land areas based on a first public data set;
adjusting, with the one or more hardware processors, the first aggregation of land areas to a second aggregation of land areas different than the first aggregation based on a second public data set; and
setting, with the one or more hardware processors, the plurality of land areas to the second aggregation of land areas.

5. The computer-implemented method of claim 4, wherein determining the position associated with the entity name for each of the plurality of land areas based on the at least one public data set and at least one private data set comprises:
determining, with the one or more hardware processors, that the position associated with the entity name for each of the plurality of land areas comprises a possible operator position or possible non-operator position based at least in part on a first private data set;
switching, with the one or more hardware processors, the position associated with the entity name for at least one of the plurality of land areas from the possible non-operator position to the possible operator position based at least in part on a second private data set; and
switching, with the one or more hardware processors, the position associated with the entity name for the at least one of the plurality of land areas from the possible operator position to the operator position based at least in part on a third private data set.

6. The computer-implemented method of claim 1, wherein the at least one private data set comprises at least one data set that comprises:
a synthesized wellbore trajectory data set;
a parcel land area data set;
a synthesized completed merger and acquisition data set;
a synthesized proposed merger and acquisition data set;
a land tract unit data set;
a private drilling permit data set;
a private well completion data set;
a private well hydraulic fracturing data set;
a private well production data set; or
private financial data associated with the entity name.

7. The computer-implemented method of claim 1, wherein identifying the entity name of the plurality of entity names comprises identifying a user selection of the entity name of the plurality of entity names.

8. A computing system, comprising:
one or more memory modules that store at least one public data set and at least one private data set;
one or more hardware processors communicably coupled to the one or more memory modules to execute instructions stored on the one or more memory modules to perform operations comprising:
identifying an entity name of a plurality of entity names;
determining a plurality of land areas associated with the entity name based on at least one public data set, at least one of the plurality of land areas comprising a hydrocarbon-bearing land area;
determining a position associated with the entity name for each of the plurality of land areas based on the at least one public data set and at least one private data set, the position comprising an operator position or a non-operator position;
determining at least a portion of the plurality of land areas in which the determined position associated with the entity name comprises the operator position;
aggregating the determined portion of the plurality of land areas to generate an operator land area for the entity name;
generating a graphical representation of the generated operator land area to present to a user on a graphical user interface (GUI);
determining at least another portion of the plurality of land areas in which the determined position associated with the entity name comprises the non-operator position;
aggregating the determined another portion of the plurality of land areas to generate a non-operator land area for the entity name;
generating a graphical representation of the generated non-operator land area to present to the user on the GUI;
determining that the position associated with the entity name for each of the plurality of land areas based on the at least one public data set and at least one private data set is exclusive of the operator position and the non-operator position;
determining at least an additional portion of the plurality of land areas in which the determined position associated with the entity name is exclusive of the operator position and the non-operator position;
aggregating the determined additional portion of the plurality of land areas to generate an unknown land area for the entity name;
generating a graphical representation of the generated unknown land area;
and simultaneously presenting the graphical representations of the generated operator land area, the generated non-operator land area, and the generated unknown land area to the user on the GUI of the user device, wherein each land area represents an acreage of the determined position associated with the entity name.

9. The system of claim 8, wherein the operations further comprise simultaneously presenting the graphical representations of the generated operator land area and non-operator land area to the user on the GUI.

10. The system of claim 8, wherein the at least one public data set includes one or more of:
merger and acquisition data associated with the entity name;
well permit data associated with the entity name;
well completion data associated with the entity name;
well production data associated with the entity name;
well hydraulic fracturing data associated with the entity name;
well trajectory data associated with the entity name; or
financial data associated with the entity name.

11. The system of claim 8, wherein the operation of determining the plurality of land areas associated with the entity name based on at least one public data set comprises:
determining a first aggregation of land areas based on a first public data set;
adjusting the first aggregation of land areas to a second aggregation of land areas different than the first aggregation based on a second public data set; and
setting the plurality of land areas to the second aggregation of land areas.

12. The system of claim 11, wherein the operation of determining the position associated with the entity name for each of the plurality of land areas based on the at least one public data set and at least one private data set comprises:
determining that the position associated with the entity name for each of the plurality of land areas comprises a possible operator position or possible non-operator position based at least in part on a first private data set;
switching the position associated with the entity name for at least one of the plurality of land areas from the possible non-operator position to the possible operator position based at least in part on a second private data set; and
switching the position associated with the entity name for the at least one of the plurality of land areas from the possible operator position to the operator position based at least in part on a third private data set.

13. The system of claim 8, wherein the at least one private data set comprises at least one data set that comprises:
a synthesized wellbore trajectory data set;
a parcel land area data set;
a synthesized completed merger and acquisition data set;
a synthesized proposed merger and acquisition data set;
a land tract unit data set;
a private drilling permit data set;
a private well completion data set;
a private well hydraulic fracturing data set;
a private well production data set; or
private financial data associated with the entity name.

14. The system of claim 8, wherein the operation of identifying the entity name of the plurality of entity names comprises identifying a user selection of the entity name of the plurality of entity names.

15. A non-transitory, computer-readable medium storing one or more instructions executable by a computer system to perform operations determining an operator position for a hydrocarbon production area, comprising:
identifying an entity name of a plurality of entity names;
determining a plurality of land areas associated with the entity name based on at least one public data set, at least one of the plurality of land areas comprising a hydrocarbon-bearing land area;
determining a position associated with the entity name for each of the plurality of land areas based on the at least one public data set and at least one private data set, the position comprising an operator position or a non-operator position;
determining at least a portion of the plurality of land areas in which the determined position associated with the entity name comprises the operator position;
aggregating the determined portion of the plurality of land areas to generate an operator land area for the entity name;

generating a graphical representation of the generated operator land area to present to a user on a graphical user interface (GUI);
determining at least another portion of the plurality of land areas in which the determined position associated with the entity name comprises the non-operator position;
aggregating the determined another portion of the plurality of land areas to generate a non-operator land area for the entity name;
generating a graphical representation of the generated non-operator land area to present to the user on the GUI;
determining that the position associated with the entity name for each of the plurality of land areas based on the at least one public data set and at least one private data set is exclusive of the operator position and the non-operator position;
determining at least an additional portion of the plurality of land areas in which the determined position associated with the entity name is exclusive of the operator position and the non-operator position;
aggregating the determined additional portion of the plurality of land areas to generate an unknown land area for the entity name;
generating a graphical representation of the generated unknown land area;
and simultaneously presenting the graphical representations of the generated operator land area, the generated non-operator land area, and the generated unknown land area to the user on the GUI of the user device, wherein each land area represents an acreage of the determined position associated with the entity name.

16. The non-transitory, computer-readable medium of claim 15, wherein the operations further comprise simultaneously presenting the graphical representations of the generated operator land area and non-operator land area to the user on the GUI.

17. The non-transitory, computer-readable medium of claim 15, wherein the at least one public data set includes one or more of:
merger and acquisition data associated with the entity name;
well permit data associated with the entity name;
well completion data associated with the entity name;
well production data associated with the entity name;
well hydraulic fracturing data associated with the entity name;
well trajectory data associated with the entity name; or
financial data associated with the entity name.

18. The non-transitory, computer-readable medium of claim 15, wherein the operation of determining the plurality of land areas associated with the entity name based on at least one public data set comprises:
determining a first aggregation of land areas based on a first public data set;
adjusting the first aggregation of land areas to a second aggregation of land areas different than the first aggregation based on a second public data set; and
setting the plurality of land areas to the second aggregation of land areas.

19. The non-transitory, computer-readable medium of claim 18, wherein the operation of determining the position associated with the entity name for each of the plurality of land areas based on the at least one public data set and at least one private data set comprises:

determining that the position associated with the entity name for each of the plurality of land areas comprises a possible operator position or possible non-operator position based at least in part on a first private data set;
switching the position associated with the entity name for at least one of the plurality of land areas from the possible non-operator position to the possible operator position based at least in part on a second private data set; and
switching the position associated with the entity name for the at least one of the plurality of land areas from the possible operator position to the operator position based at least in part on a third private data set.

20. The non-transitory, computer-readable medium of claim 15, wherein the at least one private data set comprises at least one data set that comprises:
a synthesized wellbore trajectory data set;
a parcel land area data set;
a synthesized completed merger and acquisition data set;
a synthesized proposed merger and acquisition data set;
a land tract unit data set;
a private drilling permit data set;
a private well completion data set;
a private well hydraulic fracturing data set;
a private well production data set; or
private financial data associated with the entity name.

21. The non-transitory, computer-readable medium of claim 15, wherein the operation of identifying the entity name of the plurality of entity names comprises identifying a user selection of the entity name of the plurality of entity names.

22. A computer-implemented method for determining an operator position for a hydrocarbon production area, comprising:
identifying, with one or more hardware processors, an entity name of a plurality of entity names;
determining, with the one or more hardware processors, a plurality of land areas associated with the entity name based on at least one public data set, at least one of the plurality of land areas comprising a hydrocarbon-bearing land area, wherein determining the plurality of land areas associated with the entity name based on at least one public data set comprises:
determining, with the one or more hardware processors, a first aggregation of land areas based on a first public data set, adjusting, with the one or more hardware processors, the first aggregation of land areas to a second aggregation of land areas different than the first aggregation based on a second public data set, and setting, with the one or more hardware processors, the plurality of land areas to the second aggregation of land areas;
determining, with the one or more hardware processors, a position associated with the entity name for each of the plurality of land areas based on the at least one public data set and at least one private data set, the position comprising an operator position or a non-operator position, wherein determining the position associated with the entity name for each of the plurality of land areas based on the at least one public data set and at least one private data set comprises:
determining, with the one or more hardware processors, that the position associated with the entity name for each of the plurality of land areas comprises a possible operator position or possible non-operator position based at least in part on a first private data set, switching, with the one or more hardware processors, the position associated with the entity name for at least one of the plurality of land areas from the possible non-operator position to the possible operator position based at least in part on a second private data set, and switching, with the one or more hardware processors, the position associated with the entity name for the at least one of the plurality of land areas from the possible operator position to the operator position based at least in part on a third private data set;

determining, with the one or more hardware processors, at least a portion of the plurality of land areas in which the determined position associated with the entity name comprises the operator position;

aggregating, with the one or more hardware processors, the determined portion of the plurality of land areas to generate an operator land area for the entity name;

generating, with the one or more hardware processors, a graphical representation of the generated operator land area; and simultaneously presenting the graphical representations of the generated operator land area and non-operator land area to the user on the GUI of the user device, wherein each land area represents an acreage of the determined position associated with the entity name.

23. The computer-implemented method of claim 22, further comprising:

determining, with the one or more hardware processors, at least another portion of the plurality of land areas in which the determined position associated with the entity name comprises the non-operator position;

aggregating, with the one or more hardware processors, the determined another portion of the plurality of land areas to generate a non-operator land area for the entity name;

generating, with the one or more hardware processors, a graphical representation of the generated non-operator land area to present to the user on the GUI;

determining, with the one or more hardware processors, that the position associated with the entity name for each of the plurality of land areas based on the at least one public data set and at least one private data set is exclusive of the operator position and the non-operator position;

determining, with the one or more hardware processors, at least an additional portion of the plurality of land areas in which the determined position associated with the entity name is exclusive of the operator position and the non-operator position;

aggregating, with the one or more hardware processors, the determined additional portion of the plurality of land areas to generate an unknown land area for the entity name;

generating, with the one or more hardware processors, a graphical representation of the generated unknown land area; and simultaneously presenting the graphical representations of the generated operator land area, the generated non-operator land area, and the generated unknown land area to the user on the GUI.

24. The computer-implemented method of claim 22, wherein the at least one public data set includes one or more of:

merger and acquisition data associated with the entity name;
well permit data associated with the entity name;
well completion data associated with the entity name;
well production data associated with the entity name;
well hydraulic fracturing data associated with the entity name;
well trajectory data associated with the entity name; or
financial data associated with the entity name.

25. The computer-implemented method of claim 22, wherein the at least one private data set comprises at least one data set that comprises:

a synthesized wellbore trajectory data set;
a parcel land area data set;
a synthesized completed merger and acquisition data set;
a synthesized proposed merger and acquisition data set;
a land tract unit data set;
a private drilling permit data set;
a private well completion data set;
a private well hydraulic fracturing data set;
a private well production data set; or
private financial data associated with the entity name.

26. The computer-implemented method of claim 22, wherein identifying the entity name of the plurality of entity names comprises identifying a user selection of the entity name of the plurality of entity names.

27. A computing system, comprising:

one or more memory modules that store at least one public data set and at least one private data set;

one or more hardware processors communicably coupled to the one or more memory modules to execute instructions stored on the one or more memory modules to perform operations comprising:

identifying an entity name of a plurality of entity names;

determining a plurality of land areas associated with the entity name based on at least one public data set, at least one of the plurality of land areas comprising a hydrocarbon-bearing land area, wherein the operation of determining the plurality of land areas associated with the entity name based on at least one public data set comprises:

determining a first aggregation of land areas based on a first public data set, adjusting the first aggregation of land areas to a second aggregation of land areas different than the first aggregation based on a second public data set, and setting the plurality of land areas to the second aggregation of land areas;

determining a position associated with the entity name for each of the plurality of land areas based on the at least one public data set and at least one private data set, the position comprising an operator position or a non-operator position, wherein the operation of determining the position associated with the entity name for each of the plurality of land areas based on the at least one public data set and at least one private data set comprises:

determining that the position associated with the entity name for each of the plurality of land areas comprises a possible operator position or possible non-operator position based at least in part on a first private data set, switching the position associated with the entity name for at least one of the plurality of land areas from the possible non-operator position to the possible operator position based at least in part on a second private data set, and switching the position associated with the entity name for the at least one of the plurality of land areas from the possible operator position to the operator position based at least in part on a third private data set;

determining at least a portion of the plurality of land areas in which the determined position associated with the entity name comprises the operator position;

aggregating the determined portion of the plurality of land areas to generate an operator land area for the entity name;

generating a graphical representation of the generated operator land area; and simultaneously presenting the graphical representations of the generated operator land area and non-operator land area to the user on the GUI of the user device, wherein each land area represents an acreage of the determined position associated with the entity name.

28. The computing system of claim 27, wherein the operations further comprise:

determining at least another portion of the plurality of land areas in which the determined position associated with the entity name comprises the non-operator position;

aggregating the determined another portion of the plurality of land areas to generate a non-operator land area for the entity name;

generating a graphical representation of the generated non-operator land area to present to the user on the GUI;

determining that the position associated with the entity name for each of the plurality of land areas based on the at least one public data set and at least one private data set is exclusive of the operator position and the non-operator position;

determining at least an additional portion of the plurality of land areas in which the determined position associated with the entity name is exclusive of the operator position and the non-operator position;

aggregating the determined additional portion of the plurality of land areas to generate an unknown land area for the entity name;

generating a graphical representation of the generated unknown land area; and simultaneously presenting the graphical representations of the generated operator land area, the generated non-operator land area, and the generated unknown land area to the user on the GUI.

29. The system of claim 27, wherein the at least one public data set includes one or more of:

merger and acquisition data associated with the entity name;

well permit data associated with the entity name;

well completion data associated with the entity name;

well production data associated with the entity name;

well hydraulic fracturing data associated with the entity name;

well trajectory data associated with the entity name; or financial data associated with the entity name.

30. The system of claim 27, wherein the at least one private data set comprises at least one data set that comprises:

a synthesized wellbore trajectory data set;

a parcel land area data set;

a synthesized completed merger and acquisition data set;

a synthesized proposed merger and acquisition data set;

a land tract unit data set;

a private drilling permit data set;

a private well completion data set;

a private well hydraulic fracturing data set;

a private well production data set; or private financial data associated with the entity name.

31. The system of claim 27, wherein the operation of identifying the entity name of the plurality of entity names comprises identifying a user selection of the entity name of the plurality of entity names.

32. A non-transitory, computer-readable medium storing one or more instructions executable by a computer system to perform operations determining an operator position for a hydrocarbon production area, comprising:

identifying an entity name of a plurality of entity names;

determining a plurality of land areas associated with the entity name based on at least one public data set, at least one of the plurality of land areas comprising a hydrocarbon-bearing land area, wherein the operation of determining the plurality of land areas associated with the entity name based on at least one public data set comprises:

determining a first aggregation of land areas based on a first public data set, adjusting the first aggregation of land areas to a second aggregation of land areas different than the first aggregation based on a second public data set, and setting the plurality of land areas to the second aggregation of land areas;

determining a position associated with the entity name for each of the plurality of land areas based on the at least one public data set and at least one private data set, the position comprising an operator position or a non-operator position, wherein the operation of determining the position associated with the entity name for each of the plurality of land areas based on the at least one public data set and at least one private data set comprises:

determining that the position associated with the entity name for each of the plurality of land areas comprises a possible operator position or possible non-operator position based at least in part on a first private data set, switching the position associated with the entity name for at least one of the plurality of land areas from the possible non-operator position to the possible operator position based at least in part on a second private data set, and switching the position associated with the entity name for the at least one of the plurality of land areas from the possible operator position to the operator position based at least in part on a third private data set;

determining at least a portion of the plurality of land areas in which the determined position associated with the entity name comprises the operator position;

aggregating the determined portion of the plurality of land areas to generate an operator land area for the entity name;

generating a graphical representation of the generated operator land area; and simultaneously presenting the graphical representations of the generated operator land area and non-operator land area to the user on the GUI of the user device, wherein each land area represents an acreage of the determined position associated with the entity name.

33. The non-transitory, computer-readable medium of claim 32, wherein the operations further comprise:

determining at least another portion of the plurality of land areas in which the determined position associated with the entity name comprises the non-operator position;

aggregating the determined another portion of the plurality of land areas to generate a non-operator land area for the entity name;

generating a graphical representation of the generated non-operator land area to present to the user on the GUI;

determining that the position associated with the entity name for each of the plurality of land areas based on the at least one public data set and at least one private data set is exclusive of the operator position and the non-operator position;

determining at least an additional portion of the plurality of land areas in which the determined position associated with the entity name is exclusive of the operator position and the non-operator position;

aggregating the determined additional portion of the plurality of land areas to generate an unknown land area for the entity name;

generating a graphical representation of the generated unknown land area; and simultaneously presenting the graphical representations of the generated operator land area, the generated non-operator land area, and the generated unknown land area to the user on the GUI.

34. The non-transitory, computer-readable medium of claim 32, wherein the at least one public data set includes one or more of:

merger and acquisition data associated with the entity name;

well permit data associated with the entity name;

well completion data associated with the entity name;

well production data associated with the entity name;

well hydraulic fracturing data associated with the entity name;

well trajectory data associated with the entity name; or financial data associated with the entity name.

35. The non-transitory, computer-readable medium of claim 32, wherein the at least one private data set comprises at least one data set that comprises:

a synthesized wellbore trajectory data set;

a parcel land area data set;

a synthesized completed merger and acquisition data set;

a synthesized proposed merger and acquisition data set;

a land tract unit data set;

a private drilling permit data set;

a private well completion data set;

a private well hydraulic fracturing data set;

a private well production data set; or private financial data associated with the entity name.

36. The non-transitory, computer-readable medium of claim 32, wherein the operation of identifying the entity name of the plurality of entity names comprises identifying a user selection of the entity name of the plurality of entity names.

* * * * *